United States Patent
Griffith et al.

(10) Patent No.: US 9,865,921 B2
(45) Date of Patent: Jan. 9, 2018

(54) DIRECTIONAL MULTI-BAND ANTENNA

(71) Applicant: BAE SYSTEMS plc, London (GB)

(72) Inventors: Michael Stewart Griffith, Chelmsford (GB); Leslie Charles Laycock, Chelmsford (GB)

(73) Assignee: BAE SYSTEMS plc, London (GB)

(*) Notice: Subject to any disclaimer, the term of this patent is extended or adjusted under 35 U.S.C. 154(b) by 238 days.

(21) Appl. No.: 14/762,979

(22) PCT Filed: Jan. 27, 2014

(86) PCT No.: PCT/GB2014/050205
§ 371 (c)(1),
(2) Date: Jul. 23, 2015

(87) PCT Pub. No.: WO2014/114953
PCT Pub. Date: Jul. 31, 2014

(65) Prior Publication Data
US 2015/0357713 A1    Dec. 10, 2015

(30) Foreign Application Priority Data

Jan. 28, 2013  (EP) ..................................... 13275017
Jan. 28, 2013  (GB) ................................... 1301412.1

(51) Int. Cl.
*H01Q 19/19*    (2006.01)
*H01Q 5/22*    (2015.01)
(Continued)

(52) U.S. Cl.
CPC .................. *H01Q 5/22* (2015.01); *G02B 3/14* (2013.01); *G02B 6/4225* (2013.01); *H01Q 19/19* (2013.01); *H01Q 19/192* (2013.01)

(58) Field of Classification Search
CPC ........ H01Q 5/22; H01Q 19/19; H01Q 19/192; G02B 3/14; G02B 6/4225
See application file for complete search history.

(56) References Cited

U.S. PATENT DOCUMENTS 4,701,765 A    10/1987  Arduini et al.
5,307,077 A    4/1994   Branigan et al.
(Continued)

FOREIGN PATENT DOCUMENTS

EP    1083626 A2    3/2001
FR    2510265 A1    1/1983
(Continued)

OTHER PUBLICATIONS

International Preliminary Report on Patentability and Written Opinion received for Patent Application No. PCT/GB2014/050205, dated Aug. 6, 2015. 11 pages.
(Continued)

*Primary Examiner* — Dameon E Levi
*Assistant Examiner* — David Lotter
(74) *Attorney, Agent, or Firm* — Finch & Maloney PLLC

(57) ABSTRACT

There is disclosed a directional multi-band antenna comprising: a primary reflector, at least one secondary reflector, a multi-layer dielectric layer selectively reflective or transmissive of incident radiation according to wavelength, the layer being provided at the surface of either the primary or the secondary reflector, an RF unit comprising a collocated sensor and transmitter, an Optical unit comprising a collocated sensor and transmitter, arranged such that the primary reflector is for passing signals between the secondary reflector and the environment, the secondary reflector is firstly for passing signals between the primary reflector and the RF unit, and secondly for passing signals between the primary reflector and the Optical unit and arranged such that the antenna is operable to transmit or receive, RF or Optical signals, along a common beam axis.

20 Claims, 3 Drawing Sheets

(51) Int. Cl.
G02B 3/14 (2006.01)
G02B 6/42 (2006.01)

(56) References Cited

U.S. PATENT DOCUMENTS

| | | | |
|---|---|---|---|
| 5,327,149 A | 7/1994 | Kuffer | |
| 5,977,926 A | 11/1999 | Gilger | |
| 6,483,962 B1* | 11/2002 | Novotny | G02B 6/32 359/224.1 |
| 6,606,066 B1 | 8/2003 | Fawcett et al. | |
| 2002/0105724 A1 | 8/2002 | Sugiyama | |
| 2011/0182575 A1 | 7/2011 | Kuczynski et al. | |
| 2011/0215190 A1* | 9/2011 | Pritchard | F41G 7/008 244/3.16 |
| 2012/0080552 A1* | 4/2012 | Taylor | G02B 5/08 244/3.16 |
| 2012/0326939 A1* | 12/2012 | Cannon | H01Q 19/027 343/840 |

FOREIGN PATENT DOCUMENTS

| | | |
|---|---|---|
| GB | 2188166 * | 3/1986 |
| GB | 2188166 A | 9/1987 |
| GB | 2294126 A | 4/1996 |
| WO | 2014114953 A2 | 7/2014 |

OTHER PUBLICATIONS

International Search Report received for Patent Application No. PCT/GB2014/050205, dated Aug. 22, 2014. 5 pages.
GB Intellectual Property Office Search Report under Section 17(5) received for GB Patent Application No. 1301412.1 dated Jul. 25, 2013. 4 pages.
Extended European Search Report received for EP Application No. 13275017.5, dated Jan. 27, 2014. 12 pages.
Partial European Search Report received for EP Application No. 13275017.5, dated Oct. 17, 2013. 5 pages.

* cited by examiner

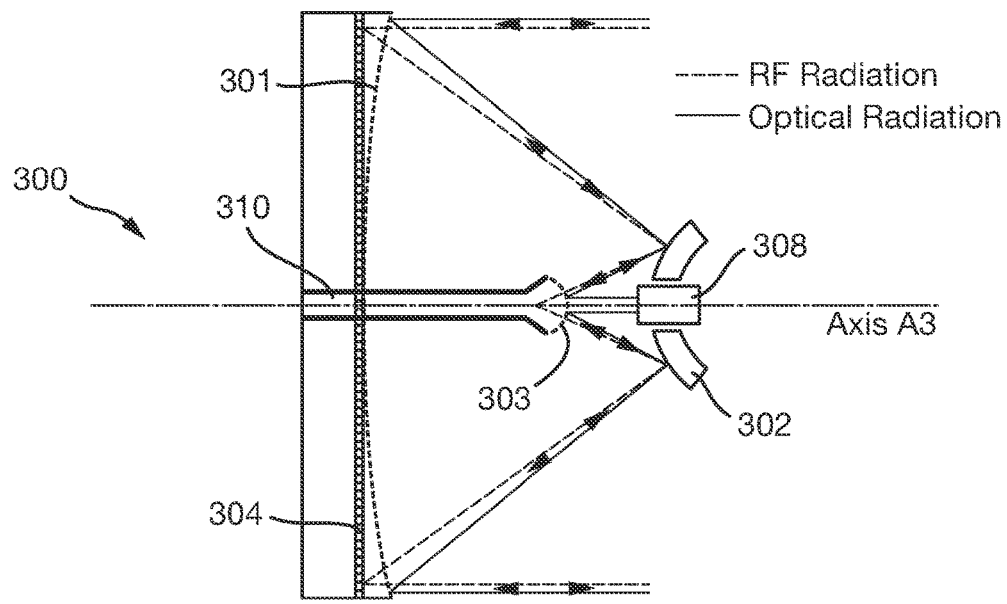
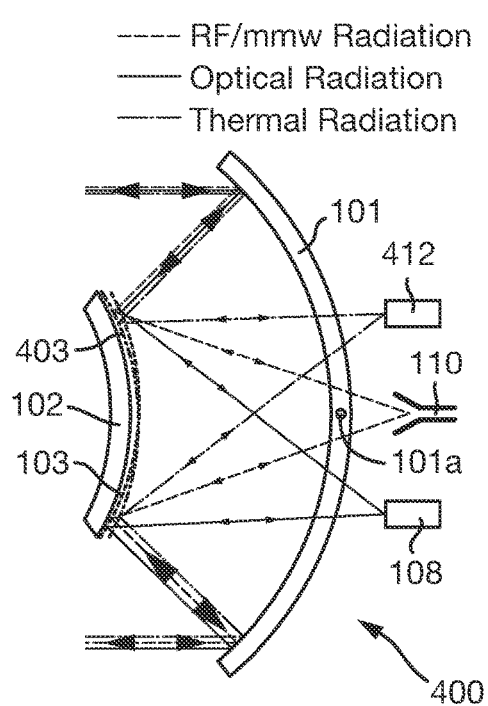
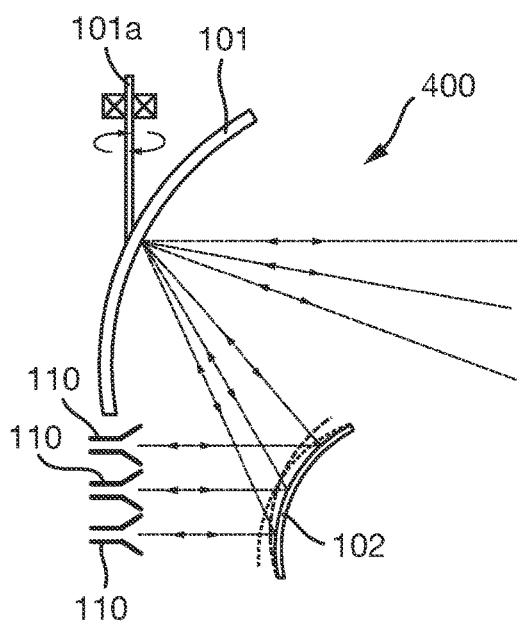

DIRECTIONAL MULTI-BAND ANTENNA

The present invention relates to a directional multi-band antenna.

It is known from for example U.S. Pat. No. 8,094,081 to provide a dual-band antenna which may transmit or receive a beam of electromagnetic radiation, at two distinct frequency/wavelength bands, to or from a further source. In U.S. Pat. No. 8,094,081 the first band of electromagnetic radiation is in the optical spectrum, and the second band of electromagnetic radiation is in the radio frequency spectrum.

Such a device transmitting or receiving different wavelength/frequency beams along the same bore sight may alternatively be referred to as a 'common aperture' antenna.

According to the present invention there is provided a directional multi-band antenna comprising: a primary reflector, at least one secondary reflector, a multi-layer dielectric layer selectively reflective or transmissive of incident radiation according to wavelength, the layer being provided at the surface of either the primary or the secondary reflector, an RF unit comprising a collocated sensor and transmitter, an optical unit comprising a collocated sensor and transmitter, arranged such that the primary reflector is for passing signals between the secondary reflector and the environment, the secondary reflector is firstly for passing signals between the primary reflector and the RF unit, and secondly for passing signals between the primary reflector and the optical unit and arranged such that the antenna is operable to transmit or receive, RF or optical signals, along a common beam axis.

Thus a robust point-to-point communications system or linear scan communication system may be provided that should tend to be capable of operation over ranges of 1 km or more. Further, by providing a reflective/transmissive coating (e.g. where optical wavelengths are substantially reflected and RF frequencies are substantially transmitted) at the primary or secondary reflector, the need to have a single surface which may appropriately reflect both RF and optical signals tends to be obviated. This tends to lower the unit cost of associated devices not only because the need to polish a surface of a reflector to the extent required for optical reflection (e.g. by having initially coated such a surface with gold) can be obviated but also because the selectively reflective/transmissive layer may be applied to an existing antenna and thereby permit retrofit.

The RF unit may be operable at 50 GHz to 70 GHz range and more particularly in the region of 60 GHz. However, other embodiments may operate in the Super high Frequency (3-30 GHz) or Extremely High Frequency (30-300 GHz) ranges. Dimensions of the antenna are generally dictated by the operational frequency (for example the diameter of the primary parabolic reflector 201 may be approximately 0.3 m for an 10 GHz carrier frequency, but may be approximately 2 m for a 15 GHz carrier frequency).

The multi-layer dielectric layer may comprise a support structure and a multi-layer dielectric coating, wherein the support structure has the multi-layer dielectric coating applied to an outward-facing surface thereof, is attached to either the primary or secondary reflector, and is shaped such that the multi-layer dielectric layer may provide a predetermined manipulation of incident optical signals, and wherein the support structure is RF transparent and the multi-layer dielectric coating is RF transparent but optically reflective.

As such, the multi-layer dielectric is further suited for retrofit to existing antenna systems. The support structure in particular can be made to measure according to the dimensions of a pre-existing antenna. Where a polymeric material is used as the support structure (and formed e.g. by injection moulding or epoxy replication), the cost of the retrofit can be further minimised.

The antenna may be in the form of an offset Cassigrain lens, the antenna comprising a single secondary reflector, and wherein the reflective/transmissive coating is provided on the surface of the secondary reflector.

Such a provision tends to eliminate components of the antenna which might obscure incoming or outgoing radiation signals.

The optical unit and the RF unit may be arranged to project/transmit along a common axis and in the same direction, wherein the secondary reflector comprises a first secondary reflector arranged to pass signals from the RF unit to the primary reflector, wherein the secondary reflector further comprises a second secondary reflector arranged to pass signals from the Optical unit to the primary reflector, and wherein the reflective/transmissive coating is provided on the surface of the primary reflector.

Such an arrangement can tend to provide a more compact antenna as compared to Cassigrain designs.

The Optical unit and the RF unit may be arranged to project/transmit along a common axis and towards each other, wherein the secondary reflector comprises a first secondary reflector arranged to pass signals from the RF unit to the primary reflector, wherein the secondary reflector further comprises a second secondary reflector arranged to pass signals from the Optical unit to the first secondary reflector, wherein the second secondary reflector is formed of a reflective/transmissive material, and wherein the reflective/transmissive coating is provided on the surface of the primary reflector.

The primary reflector surface may be substantially parabolic.

The secondary reflector may comprise a substantially hyperbolic surface.

The primary reflector surface may comprise a phased array for synthesising a parabolic RF reflector.

The antenna may comprise a thermal unit comprising a collocated sensor and transmitter, a thermal reflective/transmissive coating provided on the surface of either the primary or secondary reflector, wherein the secondary reflector is arranged to pass signals between the Thermal unit and the primary reflector, and wherein a reflective/transmissive coating is applied, the antenna thereby being arranged such that the antenna presents a common aperture for RF, Thermal and Optical communication.

The optical unit may further comprise a coupling lens, and a light conduit operably connected to the collocated optical sensor and transmitter, wherein the coupling lens is arranged to guide light into and out of the light conduit. Further, the optical unit may comprise an array of sensors surrounding the light conduit, wherein the coupling lens is an active lens with variable focus, and wherein the optical unit is further provided with a control unit, operable connected to the coupling lens and the array of sensors, the optical unit thereby being able to adapt in response to the received light signal.

By thus providing fine stabilisation, the antenna system may correct for effects from vibration or atmospheric turbulence which could otherwise inhibit the performance of the system. Further, such a provision should tend to allow for a more compact design of optical unit and therefore a more compact design of antenna.

The coupling lens may be an active lens with variable focus, and the optical unit may further comprise a sampling beam splitter arranged between the coupling lens and the light conduit to divert samples of light to an optical sensor, and thereby react to the incoming light to couple light into the light conduit.

By thus providing fine stabilisation, the antenna system may correct for effects from vibration or atmospheric turbulence which could otherwise inhibit the performance of the system.

The active lens may be translatably mounted and/or may be a fluidic lens.

So that the invention may be well understood, embodiments thereof shall now be described and with respect to the following figures of which:

FIG. 3 shows a third embodiment of a multi-band antenna,

Figure 5A:
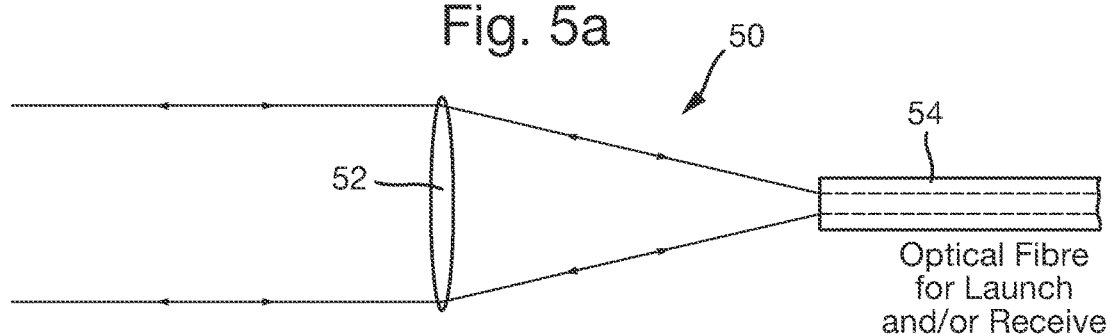
Figure 5B:
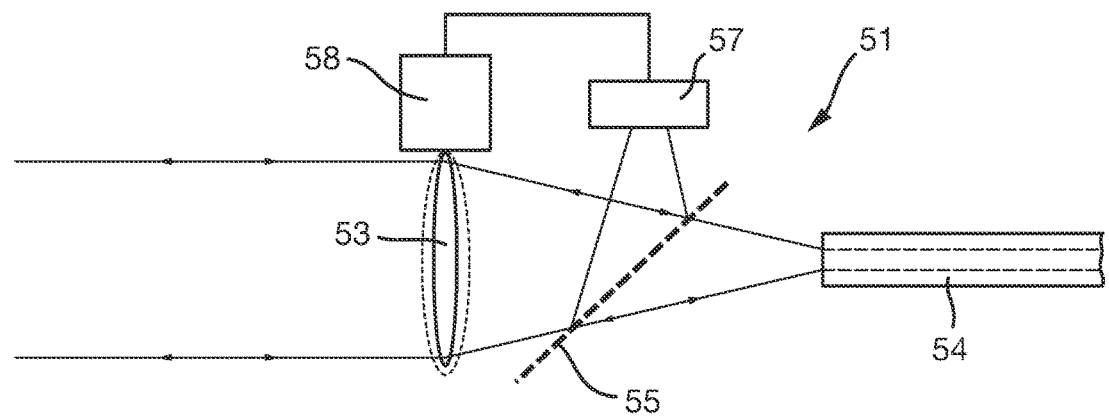
Figure 5C:
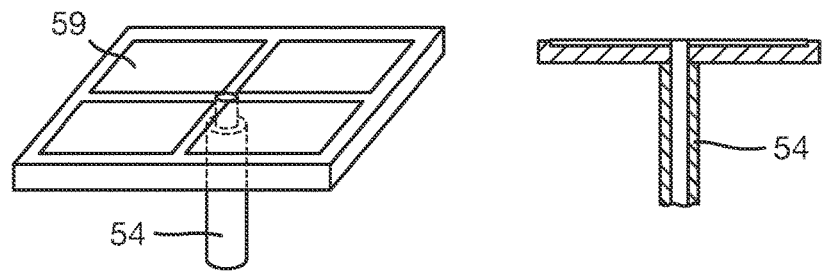

FIGS. 4a and 4b show a fourth embodiment of a multi-band antenna for linear scanning, where FIG. 4a shows a top-down aspect relative to the side-on aspect shown in FIG. 4b. In FIG. 4a transmitter/receivers (i.e. collocated sensor and transmitter) for each band are shown (in FIG. 4b, for simplicity, the transmitter/receivers of only one band are shown), FIG. 5a shows an arrangement for an optical unit for coupling optical wavelength radiation into an optical fibre and equivalently collimating light from such a fibre, FIG. 5b shows an arrangement for an optical unit as in FIG. 5a further arranged such that the beam may be manipulated and sampled, and FIG. 5c shows an arrangement for an optical unit as in FIG. 5a and provided with an alternative wavefront sampling arrangement to that shown in FIG. 5b.

Figure 1:
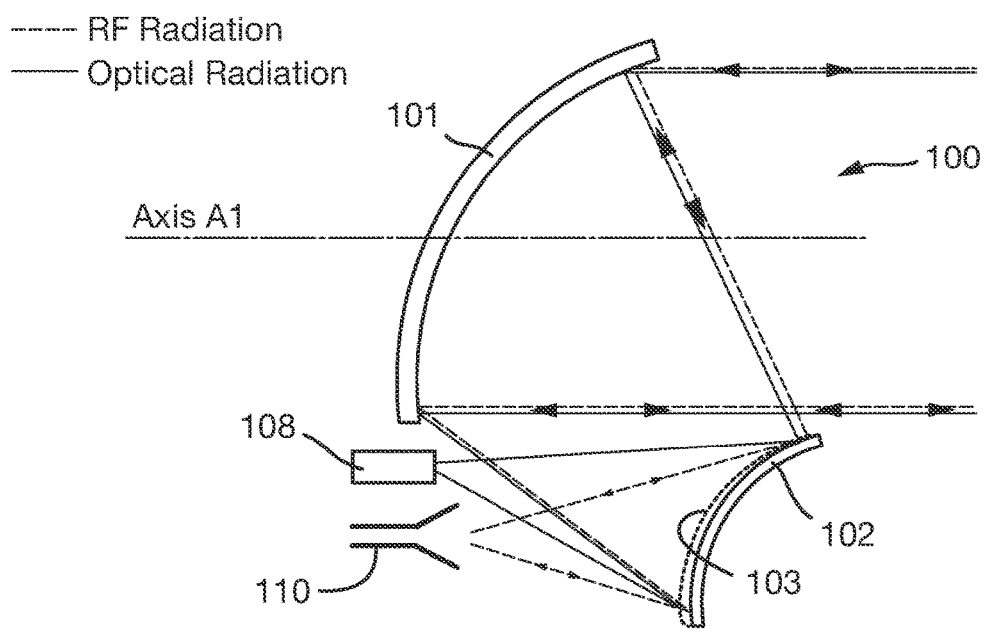
FIG. 1 shows a first embodiment of a multi-band antenna.

Referring to FIG. 1, a first embodiment of a directional multi-band antenna, shown generally at 100, comprises a primary reflector in the form of a parabolic reflector 101, and secondary reflector in the form of a hyperbolic reflector 102. The parabolic reflector 101 may alternatively be referred to as a concave reflector. The hyperbolic reflector 102 may alternatively be referred to as a convex reflector.

A multi-layer dielectric layer 103 is provided at the hyperbolic reflector 102 and is configured to be invisible to RF radiation (that is to say the layer 103 is transmissive of RF radiation) but reflective of optical radiation. The layer 103 is of a tapering thickness such that the thickness increases uniformly over the surface of the hyperbolic reflector 102. The tapering layer 103 is at its thickest at the edge furthest from the beam axis A1 (shown in a dot-dash line in the Figures), and is at its thinnest at the edge closest to the beam axis A1.

The multi-layer dielectric layer 103 is formed by applying a multi-layer dielectric coating, of substantially constant depth, to a suitably tapered support structure. The multi-layer dielectric coating is provided by alternating high (2.0-2.5) and low (1.38-1.46) refractive index layers of dielectric materials. Typical high index materials include Tantalum Peroxide ($Ta_2O_5$), Titanium Dioxide ($TiO_2$), Niobium Pentoxide ($Nb_2O_5$), Zirconium Dioxide ($ZrO_2$) and Silicon Mononitride (SiN). Low refractive index materials mainly Silicon Dioxide ($SiO_2$) and Magnesium Fluoride ($MgF_2$). The design of most coatings are based on layers of quarter-wave (QW) thickness. The broader the band covered, generally the more layers are required in the coating stack. The support structure is provided by a polymeric RF-transparent material, for example by epoxy replication or injection moulding.

The antenna 100 further comprises an optical unit 108, having a collocated optical sensor and transmitter, and an RF unit 110, having a collocated RF sensor and transmitter. The optical unit 108 and RF unit 110 are offset from one another with the offset being determined by the different focal point of the multilayer dielectric 103 as compared with the focal point of the hyperbolic reflector 102. In the arrangement shown, because the dielectric layer 103 thickens with distance from the beam axis A1, the optical unit 108 is closer to the beam axis A1 as compared with the RF unit 110.

The parabolic reflector 101 and hyperbolic reflector 102 are arranged to form generally an offset Cassigrain reflector where the parabolic reflector 101 is the primary reflector and the hyperbolic reflector 102 is a secondary reflector.

In operation, the antenna 100 may operate to transmit data as a collimated beam of RF (shown in an arrowed dashed line in the Figures) or optical (shown in an arrowed solid line in the Figures) radiation, as such the antenna is directional. Further, in operation the antenna 100 may operate to receive data as a beam of RF or optical radiation. As the antenna 100 is provided with an RF unit 110 and a separate optical unit 108, the antenna 100 may perform as an RF antenna and as an optical antenna simultaneously and in independence of the other.

When transmitting RF radiation, an RF signal is generated at the RF unit 110 which divergently propagates towards the hyperbolic reflector 102. The RF signal propagates through the multi-layer dielectric 103, generally without reflection or refraction, and onto the surface of the reflector 102.

At the reflector 102, the RF signal is reflected towards the parabolic reflector 101 and upon illuminating the parabolic reflector 101 is reflected such that a collimated beam of RF radiation is transmitted from the antenna 100 along beam axis A1.

When transmitting optical radiation, an optical signal is generated at the optical unit 108 which divergently propagates towards the hyperbolic reflector 102. The optical signal illuminates the multi-layer dielectric 103 and is reflected towards the parabolic reflector 101. The multi-layer dielectric 103 tends to reflect substantially all (e.g. more than 90%) of the incident optical radiation.

Upon illuminating the parabolic reflector 101, the optical signal is reflected and collimated such that the optical signal is emitted as a beam along the axis A1.

The antenna 100 may receive RF or optical radiation that propagates towards the primary reflector 101 along axis A1. The primary reflector 101 acts to reflect both RF and optical components of such radiation towards the collocated secondary reflector 102 and multi-layer dielectric 103.

RF radiation passing from the primary reflector 101 to the secondary reflector 102 will pass through the multi-layer dielectric 103 and be reflected and focussed towards the RF unit 110, whereupon the RF radiation may be received at the RF unit 110 for processing.

Optical radiation passing from the primary reflector 101 to the secondary reflector 102 will be reflected by the multi-layer dielectric 102 and be reflected and focussed towards the optical unit, whereupon optical radiation may be receive at the optical unit 108 for processing.

The reflectors 101 and 102 are made of a carbon fibre composite to provide a lightweight apparatus with a high strength-to-weight ratio. However, as would be apparent to the skilled reader any structurally stable material capable of taking a metal coating could alternatively be used (for example Aluminium, Silicon Carbide, or Silicon). Further various internal structures could be contemplated such as honeycomb or foam.

The multi-layer dielectric 103 is made from a layering of a high refractive index material on a low refractive index material with the surface shaped by a support structure to give the desired beam manipulation. In particular, magnesium fluoride is the low refractive index material and tantalum peroxide is the high refractive index material. However, the skilled man should be able to select alternative materials for the layering from the group comprising these materials and also silicon dioxide, zinc sulphide and titanium dioxide.

Figure 2:
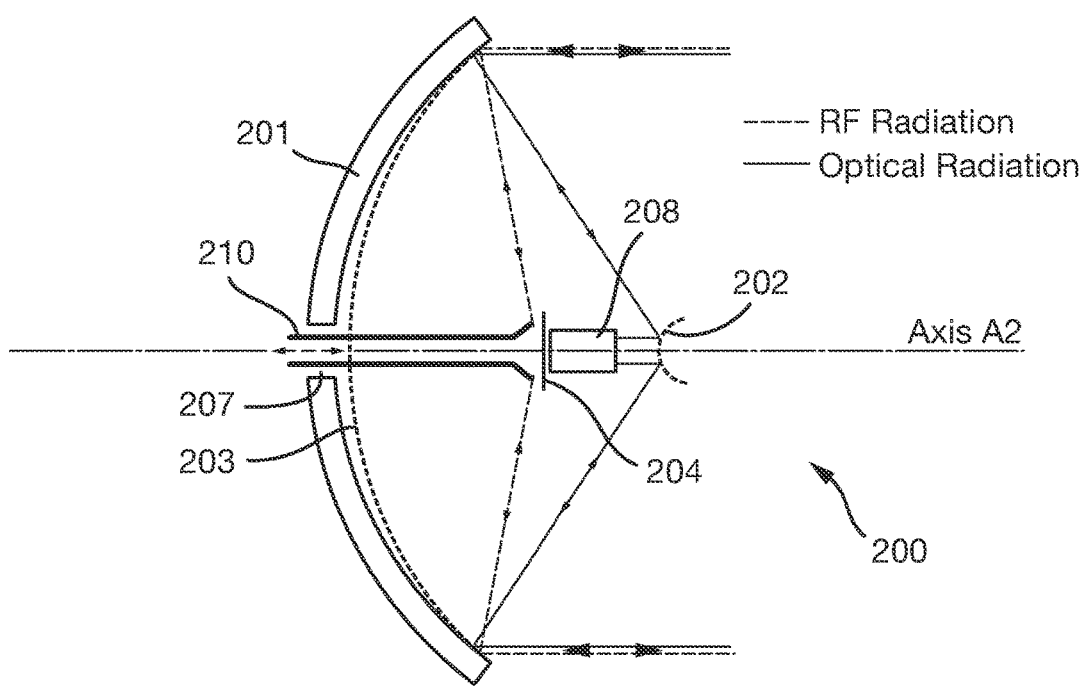
FIG. 2 shows a second embodiment of a multi-band antenna.

Referring to FIG. 2, a second embodiment of a directional multi-band antenna is shown generally at 200. The multi-band antenna 200 comprises a parabolic primary reflector 201, symmetrical about an axis A2, and with an aperture 207 at its centre.

The parabolic reflector 201 has applied to it a multi-layer dielectric 203. The multi-layer dielectric 203 is thickest towards the centre of the parabolic reflector 201 and tapers at a constant rate towards the periphery of the reflector 201. As such, the multi-layer dielectric 203 has a longer focal length than the primary RF reflector 201. In general, the multi-layer dielectric 203 will be formed in an equivalent manner to the multi-layer dielectric 103 but with the support structure shaped to provide the desired tapering thickness.

The antenna 200 is provided with an RF unit 210, comprising a horn, that extends through the aperture 207 along the axis A2. Mounted in front of the RF unit 210 (that is to say mounted further away from the parabolic reflector 201) and arranged perpendicular to the axis A2, is a planar reflector 204 (alternatively referred to as a splash plate reflector). Mounted in front of the planar reflector 204 is an optical unit 208 which is aligned with the axis A2. The optical unit 208 faces frontwards, which is the same direction as the RF unit 210.

Disposed in front of the optical unit 208 is a hyperbolic multi-layer dielectric reflector 202 which is aligned with the axis A2 and faces the optical unit 208.

In operation, the antenna 200 may operate to transmit data as a highly directional beam of RF or optical radiation. Further, in operation the antenna 200 may operate to receive data as a beam of RF or optical radiation. As the antenna 200 is provided with an RF unit 210 and a separate optical unit 208, the antenna 200 may perform as an RF antenna and as an optical antenna simultaneously and independently.

If operating to transmit RF signals, the RF unit 210 generates an RF signal which propagates divergently towards the planar reflector 204. Upon illuminating the planar reflector 204, at least a portion of the RF signal is reflected backwards towards the parabolic reflector 201. The reflected RF signal passes through the multi-layer dielectric 203 and illuminates the parabolic reflector 201 whereupon the RF signal is reflected and collimated to propagate as a beam along axis A2.

Beams of RF propagating onto the parabolic reflector 201 along axis A2 will be reflected onto the RF unit 210 via the planar reflector 204.

If operating to transmit optical signals, the optical unit 208 generates a collimated optical signal that propagates along the bore sight of the unit 208 and onto the hyperbolic multi-layer dielectric 202. Optical signals illuminating the hyperbolic multi-layer dielectric are reflected back towards the parabolic reflector 201. However optical signals propagating thus do not tend to reach the parabolic reflector 201. Instead, the optical signals reflected by the hyperbolic multilayer dielectric illuminate the multi-layer reflector 203 and are thereby collimated and directed along axis A2.

Beams of optical radiation propagating towards the parabolic reflector 201 along axis A2 will be reflected onto the optical unit 210 via firstly the multi-layer dielectric 203 and secondly the hyperbolic multi-dielectric reflector 202. Light signals illuminating the optical unit 210 may then be analysed further.

In variations of this embodiment, the splash plate reflector type planar reflector 204 may be replaced by a ring focus sub-reflector or similar (such as is shown in US2005-0099350, U.S. Pat. No. 4,963,878, or U.S. Pat. No. 6,724,349).

Referring to FIG. 3, a third embodiment of a directional multi-band antenna, shown generally at 300 comprises a planar phased array antenna 304, a sub-reflector 302, an RF unit 310 comprising a horn, an optical unit 308 and a hyperbolic multi-layer dielectric reflector 303.

A multi-layer dielectric mirror 301 is applied to the surface of the phased array 304 and has a greater depth at its periphery as compared to its central region. The thickness varies so as to provide a parabolic reflector surface for optical signals propagating towards the array 304.

The RF unit 310 and the optical unit 308 are arranged to be aligned and to face each other along a central antenna axis A3 defined by the array 304. A curved multilayer dielectric surface 303 is disposed at the mouth of the RF unit 310 with the concave face of the surface 303 towards the RF unit 310 and the convex face of the surface 303 disposed towards the optical unit 308.

The optical unit 308 is situated within a central aperture of the sub-reflector 302. The sub reflector 302 is a hyperbolic reflector arranged symmetrically about the axis A3 and facing the RF unit 310.

In operation, the antenna 300 may operate to transmit data as a substantially collimated beam of RF or optical radiation, and as such is a directional antenna. Further, in operation the antenna 300 may operate to receive data as a beam of RF or optical radiation. As the antenna 300 is provided with an RF unit 310 and a separate optical unit 308, the antenna 300 may perform as an RF antenna and as an optical antenna simultaneously and independently.

Whilst operating in an RF transmission mode, the RF unit 310 generates an RF signal which propagates through the curved dielectric surface 303 and onto the sub-reflector 302. Having illuminated the sub-reflector 302, the RF signal is reflected back towards the phased array 304, passing through the multi-layer dielectric mirror 301. The phased array 304 is configured and energised with appropriately addressed electrical signals such that it acts as a parabolic lens for the relevant RF signals, reflecting and collimating the RF signal and thereby creating a directional RF beam along axis A3.

For RF reception, RF signals incident upon the array 304 along the axis 304 are focused and reflected onto the RF unit 310 via the sub-reflector 302 (passing through the RF-transmissive curved surface 303 immediately prior to arrival at the RF unit 310).

For optical transmissions, the optical unit 308 generates a collimated optical signal that propagates towards the curved surface 303 and is thereupon divergently reflected back towards the sub-reflector 302. Having illuminated the sub-reflector 302, the optical signal is reflected and continues divergently towards the multi-layer mirror 301. Upon illuminating the multi-layer mirror 301, the optical signal is reflected and collimated to continue as a beam along axis A3.

The antenna 200 and 300 have different primary reflectors. However in both cases, the primary reflector functions as a parabolic reflector for the RF signal incident upon it, and is provided with an optical-reflective/RF-transmissive layer at the primary reflector which functions as a parabolic reflector for the optical signals. As such the combined array 304 and mirror 301 of the FIG. 3 antenna 300 are (provided that for example the dimensions are equivalent) interchangeable with the parabolic primary 201 and associated dielectric layer 203 of the FIG. 2 antenna 200.

Referring to FIGS. 4*a* and 4*b*, there is shown a fourth embodiment of the invention, referred to generally at 400, which is similar to the first embodiment discussed above, but differs for example in that whereas the first embodiment was a directional multi-band antenna for operating over two distinct bands, the fourth embodiment is a directional multi-band antenna for operating over three distinct bands. Further, the directional antenna of FIGS. 4*a* and 4*b* is arranged for linear scanning and as such provides a beam which is collimated in one aspect (e.g. horizontally) but divergent in the other (e.g. vertically) to allow scanning (e.g. through rotation in the azimuth plane).

As such, in comparison with the first embodiment, the fourth embodiment multi-band antenna 400 is further provided with firstly a thermal unit 412 comprising a collocated infra-red sensor and infra-red transmitter, and secondly a suitable multi-layer dielectric layer 403 that is reflective of IR radiation but transmissive of RF radiation and optical radiation.

Each of the band units 412, 110, 108 are provided with an array of transmitter/receivers for that particular band. For example, as can be seen from FIG. 4*b*, where only the RF transmitter/receivers 110 are shown for simplicity, there are three RF transmitter/receivers 110. These three transmitters are arranged such that they project towards the hyperbolic reflector 102 which acts to focus the projection from each transmitter 110 onto the same arc along the surface of the parabolic reflector 101. Further, the arrangement is such that radiation is reflected from the antenna 400 as a beam that is broad (i.e. diverging) in one aspect, the vertical aspect in this embodiment, and narrow (i.e. generally collimated) in the other, the horizontal aspect in this embodiment. As such, the antenna 400 is suited for use as a scanning antenna and is provided with means 101*a* for rotating the parabolic reflector 101 relative to the transmitter/receiver array and the hyperbolic reflector 102. As described, the antenna is for scanning in the azimuth plane, however, it may be readily adapted for scanning in other planes e.g. the elevation.

The operation of the antenna 400 has been explicitly described in respect of the RF transmitter/receivers 110. For sake of completeness, it is noted that the antenna 400 would have a unit of thermal radiation transmitters arranged equivalently to the RF transmitter/receivers and composed of a plurality of sub-units to provide the strip-type illumination of the dielectric layer 403 on the hyperbolic reflector 102 which leads to the outward beam for scanning. Further the antenna 400 would have a unit of optical transmitters arranged equivalently to the RF transmitter/receivers and composed of a plurality of sub-units to provide the strip-type illumination of the dielectric layer 103 on the hyperbolic reflector 102 which leads to the outward beam for scanning.

The means 101*a* for rotating oscillating the parabolic reflector 101 is shown as a simple axle fixed to the reflector 101 which may be supported on a bearing and oscillated over a limited range (e.g. plus or minus 30 degrees from a central position) by a motor or other actuator.

The multi-layer dielectric layer 403 is made from a layering of a high refractive index material on a low refractive index material with the surface shaped to give the desired beam manipulation. In particular, magnesium fluoride is the low refractive index material and tantalum peroxide is the high refractive index material. However, the skilled man should be able to select alternative materials for the layering from a group comprising these materials and also silicon dioxide, zinc sulphide and titanium dioxide.

As shown in FIGS. 4*a* and 4*b*, the layer 103 is applied on top of the layer 403 to spatially address the different radiation bands to their respective receiver/transmitter (412 or 108). However, in alternative embodiments band-specific beamsplitters may be used to divert a certain band of radiation from a single multilayer dielectric onto the relevant transmitter/receiver (412 or 108).

Referring to FIG. 5*a*, an optical coupling device 50 is shown as may be included in an optical unit, such as 208 or 308, for transmitting or receiving collimated light.

The coupling device comprises a biconvex lens 52 arranged in the beam and configured to focus the beam to an optical fibre 54 (though other optical conduits may be used in alternative embodiments, indeed fibre 54 could be replaced by n optical sensor array such as CCD or CMOS). The optical fibre 54 may transfer optical signals to and from an optical processing module (not shown).

In certain variants, the lens 52 may be replaced with a complex multi-lens assembly.

In variants where the coupling device 50 is for non-collimated beams, the biconvex lens 52 may be replaced by a biconcave lens.

A more complex optical coupling device, referred to generally at 51 is shown in FIG. 5*b*. In addition to the device 50 of FIG. 5*a*, device 51 comprises an active lens 53 and also is provided with a beam splitter 55 positioned between the lens 53 and the optical fibre 54.

The beam splitter 55 is arranged to reflect a portion (typically 10%) of the incoming light signal to an optical sensor 57. The optical sensor 57 is connected to a lens control unit 58 such that the active lens 53 may take on an optimal shape for focussing/collimating the light signal, having considered the sample taken from the beam splitter 55.

In the present embodiment, the active lens 53 is a fluidic lens which may be provided on a tip-tilt mount and thereby be able to perform beam steering operations. In variant embodiments, the fluidic lens may be replaced by another form of active lens or active optical device such as a dynamic hologram.

As an alternative to the combination of the beam splitter 55 and the sensor 57, the optical coupling device 51 may be provided with an array of sensors 59 surrounding the optical fibre 54. The array of sensors 59 and mounted on a planar substrate which is arranged perpendicularly to the beam axis. The array of sensors 59 may be interfaced with the control unit 58 of the active lens 53 such that the condition of the light signal at the fibre 54 may be fed back to the lens 53, and the lens 53 adapted accordingly.

The sensors 59 may be fabricated according to the wavelength of radiation they are due to encounter. In particular, where the sensor 59 is for detecting 400 nm-1100 nm wavelengths, the main semi-conductor used is silicon. Where the sensor 59 is for detecting 1300 nm-1500 nm wavelengths, the main semi-conductor is indium gallium arsenide (InGaAs).

So as to present a generally uncluttered representation of the invention, the figures do not include the struts and/or housings to which the reflectors, optical units, RF units etc would be attached. Nor is such matter extensively discussed in the description. However it would be well within the ambit of the skilled man to determine and insert such mountings.

The struts and housings may be formed from a dielectric that is transparent to both RF and optical signals.

Variants of the above disclosures are possible.

In particular, whilst the above embodiments tend to show sensors aligned vertically or horizontally, it would be equally possible to provide other configurations of sensors, e.g. offset from vertical or horizontal, diagonally aligned, aligned on the same arc, provided that the relevant reflectors were suitably shaped to address corresponding signals to sensors.

Further, whilst the cassegrain configurations discussed and shown above in e.g. as in FIG. 1, have a generally classic form, other forms of cassegrain are comtemplated. In particular the cassegrain may have a hyperbolic primary reflector, or may comprise spherical, hem i-spherical or elliptical reflectors as variants.

In general, projected beams and received signals, are collimated, however, in variants of the invention, the beams may be collimated only in one dimension (to provide a linear scanning-type antenna) or may even be slightly divergent in both dimensions provided the antenna is still operable to detect in a limited area of the volume into which it is deployed and thereby function as a directional antenna.

In certain embodiments, the RF sensor could, instead of having the form of an RF horn, be replaced with a phased array sensor. The optical sensors may be CCD arrays or CMOS array.

A means for directing the antenna has been shown in respect of FIGS. 4a and 4b. However, means for directing the antenna could be applied to any of embodiments discussed. Further, the means of directing the antenna may be in the form of a gimbal operable to scan in both the azimuth and elevation.

Whilst various embodiments have been described above, each having specific combinations of components, it would be apparent to the skilled man, upon reading this disclosure, which components could be inserted from one embodiment to another. Further, it would be apparent which features could be substituted for another between embodiments. Having regard for inherent incompatibilities, there is no reason why components or features from one embodiment may not be transferred to another.

The invention claimed is:

1. A directional multi-band antenna comprising:
a primary reflector;
at least one secondary reflector;
a multi-layer dielectric layer selectively reflective or transmissive of incident radiation according to wavelength, the multi-layer dielectric layer being provided at a surface of either the primary or the secondary reflector;
an RF unit comprising a collocated sensor and transmitter, the RF unit positioned on a first side of the secondary reflector; and
an optical unit comprising a collocated sensor and transmitter, the optical unit positioned on the first side of the secondary reflector;
wherein:
the primary reflector is for passing signals between the secondary reflector and the environment;
the secondary reflector is for reflecting RF signals from the primary reflector to the RF unit and from the RF unit to the primary reflector, and for reflecting optical signals from the primary reflector to the optical unit and from the optical unit to the primary reflector; and
the antenna is operable to transmit or receive, RF or Optical signals, along a common beam axis;
wherein the secondary reflector is operable to reflect both the RF signals received from the primary reflector and the optical signals received from the primary reflector along the common beam axis in a same direction away from the secondary reflector.

2. The antenna according to claim 1 wherein the multi-layer dielectric layer comprises a support structure and a multi-layer dielectric coating, wherein the support structure has the multi-layer dielectric coating applied to an outward-facing surface thereof, is attached to either the primary or secondary reflector, and is shaped such that the multi-layer dielectric layer may provide a predetermined manipulation of incident optical signals, and wherein the support structure is RF transparent and the multi-layer dielectric coating is RF transparent but optically reflective.

3. The antenna according to claim 1 wherein the antenna is in the form of an offset cassegrain lens, the antenna comprising a single secondary reflector, and wherein a reflective/transmissive coating is provided on the surface of the secondary reflector.

4. The antenna according to claim 1 wherein a reflective/transmissive coating is provided on the surface of the primary reflector.

5. The antenna according to claim 1 wherein the optical unit and the RF unit are arranged to project/transmit along a common axis and towards each other, and wherein a reflective/transmissive coating is provided on the surface of the primary reflector.

6. The antenna according to claim 1 wherein the primary reflector surface is substantially parabolic.

7. The antenna according to claim 1 wherein the secondary reflector comprises a substantially hyperbolic surface.

8. The antenna according to claim 1 wherein the primary reflector surface comprises a phased array for synthesising a parabolic RF reflector.

9. The antenna according to claim 1 further comprising a thermal unit comprising a collocated sensor and transmitter, a thermal reflective/transmissive coating provided on the surface of either the primary or secondary reflector, wherein the secondary reflector is arranged to pass signals between the thermal unit and the primary reflector, and wherein a reflective/transmissive coating is applied, the antenna thereby being arranged such that the antenna presents a common aperture for RF, thermal, and optical communication.

10. The antenna according to claim 1, the optical unit further comprising a coupling lens, and a light conduit operably connected to the collocated optical sensor and transmitter, wherein the coupling lens is arranged to guide light into and out of the light conduit.

11. The antenna according to claim 10 wherein the optical unit comprises an array of sensors surrounding the light conduit, wherein the coupling lens is an active lens with variable focus, and wherein the optical unit is further provided with a control unit, operably connected to the coupling lens and the array of sensors, the optical unit thereby being able to adapt in response to the received light signal.

12. The antenna according to claim 10 wherein the coupling lens is an active lens with variable focus, and the optical unit further comprises a sampling beam splitter arranged between the coupling lens and the light conduit to divert samples of light to an optical sensor, and thereby react to the incoming light to couple light into the light conduit.

13. The antenna according to claim 11 wherein the active lens is translatably mounted.

14. The antenna according to any one of claim 11 wherein the active lens is a fluidic lens.

15. A directional multi-band antenna comprising:
- a primary reflector;
- at least one secondary reflector;
- a multi-layer dielectric layer selectively reflective or transmissive of incident radiation according to wavelength, the multi-layer dielectric layer being provided at a surface of either the primary or the secondary reflector;
- an RF unit comprising a collocated sensor and transmitter, the RF unit positioned on a first side of the secondary reflector; and
- an optical unit comprising a collocated sensor and transmitter, the optical unit positioned on the first side of the secondary reflector;
- wherein the optical unit and the RF unit are arranged to project/transmit along a common axis and in the same direction and away from the secondary reflector, wherein the secondary reflector is arranged to reflect RF signals from the RF unit to the primary reflector and to reflect RF signals from the primary reflector to the RF unit, wherein the secondary reflector is further arranged to reflect optical signals from the optical unit to the primary reflector and to reflect optical signals from the primary reflector to the optical unit, and wherein the reflective/transmissive coating is provided on the surface of the primary reflector.

16. The antenna according to claim 15 wherein the multi-layer dielectric layer comprises a support structure and a multi-layer dielectric coating, wherein the support structure has the multi-layer dielectric coating applied to an outward-facing surface thereof, is attached to either the primary or secondary reflector, and is shaped such that the multi-layer dielectric layer may provide a predetermined manipulation of incident optical signals, and wherein the support structure is RF transparent and the multi-layer dielectric coating is RF transparent but optically reflective.

17. The antenna according to claim 15, the optical unit further comprising a coupling lens, and a light conduit operably connected to the collocated optical sensor and transmitter, wherein the coupling lens is arranged to guide light into and out of the light conduit, wherein the optical unit further comprises an array of sensors surrounding the light conduit, wherein the coupling lens is an active lens with variable focus, and wherein the optical unit is further provided with a control unit, operably connected to the coupling lens and the array of sensors, the optical unit thereby being able to adapt in response to the received optical signal.

18. A directional multi-band antenna comprising:
- a primary reflector;
- at least one secondary reflector;
- a multi-layer dielectric layer selectively reflective or transmissive of incident radiation according to wavelength, the multi-layer dielectric layer being provided at a surface of either the primary or the secondary reflector;
- an RF unit comprising a collocated sensor and transmitter, the RF unit positioned on a first side of the secondary reflector; and
- an optical unit comprising a collocated sensor and transmitter, the optical unit positioned on the first side of the secondary reflector;
- wherein the optical unit and the RF unit are arranged to project/transmit along a common axis and towards each other and away from the secondary reflector, wherein the secondary reflector is arranged to reflect RF signals from the RF unit to the primary reflector and to reflect RF signals from the primary reflector to the RF unit, wherein the secondary reflector is further arranged to reflect optical signals from the optical unit to the secondary reflector and to reflect optical signals from the secondary reflector to the optical unit, wherein the secondary reflector is formed of a reflective/transmissive material, and wherein the reflective/transmissive coating is provided on the surface of the primary reflector.

19. The antenna according to claim 18, the optical unit further comprising a coupling lens, and a light conduit operably connected to the collocated optical sensor and transmitter, wherein the coupling lens is arranged to guide light into and out of the light conduit, wherein the optical unit further comprises an array of sensors surrounding the light conduit, wherein the coupling lens is an active lens with variable focus, and wherein the optical unit is further provided with a control unit, operably connected to the coupling lens and the array of sensors, the optical unit thereby being able to adapt in response to the received optical signal.

20. The antenna according to claim 18 wherein the active lens is at least one of translatably mounted and a fluidic lens.

* * * * *